(12) United States Patent
Minami et al.

(10) Patent No.: US 6,707,249 B2
(45) Date of Patent: Mar. 16, 2004

(54) ELECTROLUMINESCENT DEVICE AND OXIDE PHOSPHOR FOR USE THEREIN

(75) Inventors: Tadatsugu Minami, Kanazawa (JP); Toshihiro Miyata, Kanazawa (JP); Toshiaki Ueno, Yokohama (JP); Yuji Urano, Yokohama (JP)

(73) Assignee: Hokushin Corporation, Kanagawa (JP)

( * ) Notice: Subject to any disclaimer, the term of this patent is extended or adjusted under 35 U.S.C. 154(b) by 53 days.

(21) Appl. No.: 09/942,404

(22) Filed: Aug. 30, 2001

(65) Prior Publication Data

US 2002/0047515 A1 Apr. 25, 2002

(30) Foreign Application Priority Data

Aug. 30, 2000 (JP) .......................... 2000-306832
Nov. 5, 2000 (JP) .......................... 2000-375290

(51) Int. Cl.[7] .................................. H01J 31/00
(52) U.S. Cl. ................. 313/504; 313/486; 252/301.4 R
(58) Field of Search .................. 313/486, 503, 313/504; 252/509, 301.6, 301.4 R

(56) References Cited

U.S. PATENT DOCUMENTS 5,309,069 A * 5/1994 Sigai et al. ................. 313/486
5,670,839 A * 9/1997 Noma et al. ................. 313/503

FOREIGN PATENT DOCUMENTS

| FR | 2089918 | 1/1972 |
|---|---|---|
| JP | 7106065 | 6/1994 |
| JP | 9148071 | 11/1996 |
| JP | 2000340366 | 5/1999 |
| JP | 200143977 | 6/1999 |

OTHER PUBLICATIONS

*Synthesis and Luminescence Properties of Europium–Activated Yttrium Germanate*, Sb Nauch. Tr., Vses, Nauch, Issled. Inst. Lyuminoforov Osovo Chist. Veshchestv, No. 7.

*Fluorescence of Mixed Metal Oxides, VI. Temperature Dependence of the Fluorescence*, Journal of the Electrochemical Society, 114 (8).

* cited by examiner

Primary Examiner—Vip Patel
(74) Attorney, Agent, or Firm—Huntley & Associates LLC

(57) ABSTRACT

The present invention provides an oxide phosphor for use in an electroluminescent device, which phosphor is capable of providing a high-luminance EL device while the composition thereof is controlled to be as simple as possible, and which phosphor attains multi-color and full-color light emissions without the need for treatment at a high temperature greatly in excess of 1,000° C. The invention also provides an electroluminescent device employing the phosphor. The oxide phosphor for use in an electroluminescent device is formed from an yttrium (Y) oxide as a matrix and at least one transition metal element as an activator, or from a Y—Ge—O oxide or a Y—Ge—Si—O oxide as a matrix and at least one metallic element, as a luminescence center, selected from among transition metal elements and rare earth metal elements.

20 Claims, 10 Drawing Sheets

Operating Voltage $V_{op}$ (V)

ELECTROLUMINESCENT DEVICE AND OXIDE PHOSPHOR FOR USE THEREIN

BACKGROUND OF THE INVENTION

1. Field of the Invention

The present invention relates to an oxide phosphor for use in an electroluminescent device and to an electroluminescent device containing the phosphor.

2. Background Art

Conventionally, sulfides, particularly zinc sulfate (ZnS), have frequently been employed as phosphors for use in an electroluminescent device (hereinafter referred to as EL device). In recent years, as a new phosphor thin film for use in EL devices, there has been developed oxide phosphor thin film which contains gallium (Ga) and/or calcium (Ca) and to which an arbitrary luminescence center has been added (Japanese Patent Application Laid-Open (kokai) No. 10-270168).

However, in red, green, and blue emissions, which are required when full-color emission is to be realized, the aforementioned sulfide phosphors cannot attain sufficient calorimetric purity or luminance that would allow them to be put into practice. In addition, they are chemically unstable, and particularly very unstable when exposed to moisture. Thus, a special sealing treatment of thin film EL devices must be carried out in order to completely remove moisture, posing a crucial problem; i.e., elevating production costs of the devices.

Oxide phosphor thin films employing oxide phosphors such as Mn-doped zinc silicate ($Zn_2SiO_4$:Mn) have already been put into practice as chemically stable phosphor material for use in EL devices (as disclosed, for example, in Japanese Patent Application Laid-Open (kokai) Nos. 04-209693 and 10-270168). Most of the above oxide phosphors comprise, as host material, ternary compounds or multi-component oxides, and their complex compositions make these compounds and oxides difficult to form into thin film of excellent crystallinity. In order to attain high luminance, the phosphors must undergo heat treatment at a comparatively high temperature. Thus, disadvantageously, phosphor thin film of a desired composition cannot be produced with high reproducibility.

SUMMARY OF THE INVENTION

In view of the foregoing, the present inventors have carried out extensive studies in order to solve the aforementioned problems and have found the following: Although $Y_2O_3$:Eu, which is known to serve as a cathodolumin (CL) luminescence phosphor or a photoluminescence (PL) phosphor, is unusable as an electroluminescence (EL) phosphor, when manganese is added to its matrix $Y_2O_3$—a binary compound which is readily crystallized—the resultant $Y_2O_3$:Mn, which cannot act as a CL or PL phosphor, acts as an excellent electroluminescence (EL) phosphor. The present invention has been accomplished on the basis of this finding.

Thus, an object of the present invention is to provide an oxide phosphor for use in an electroluminescent device, which phosphor is capable of providing a high-luminance EL device while the composition thereof is controlled to be as simple as possible, and which phosphor attains multi-color and full-color light emissions without need for treatment at a high temperature greatly in excess of 1,000° C. Another object of the invention is to provide an electroluminescent device employing the phosphor.

Accordingly, in a first aspect of the invention, there is provided an oxide phosphor for use in an electroluminescent device, which phosphor comprises an yttrium (Y) oxide as a matrix and at least one transition metal element as an activator.

Preferably, the yttrium oxide is yttrium oxide ($Y_2O_3$).

Preferably, the phosphor further contains at least one rare earth metal element as the activator.

Preferably, the phosphor contains the transition metal element in an amount of about 0.1–10 at. % based on yttrium (Y).

In a second aspect of the invention, there is provided an oxide phosphor for use in an electroluminescent device, which phosphor comprises, as a matrix, a Y—Ge—O oxide containing yttrium (Y) and germanium (Ge) and, as an activator, at least one metallic element.

Preferably, the phosphor contains germanium (Ge) in an amount of about 0.01–99 mol % based on the total amount of the Y—Ge—O oxide containing yttrium (Y) and germanium (Ge).

Preferably, the matrix is a complex oxide comprising yttrium oxide ($Y_2O_3$) and germanium oxide ($GeO_2$).

Preferably, the matrix is at least one ternary compound selected from the group consisting of $Y_2GeO_5$, $Y_2Ge_2O_7$, and $Y_4GeO_8$ (yttrium germanates).

Preferably, silicon (Si) is partially substituted for germanium (Ge) in the matrix.

Preferably, the Y—Ge—Si—O phosphor contains silicon (Si) in an amount of about 0.01–99 mol % based on the total amount of an oxide of germanium (Ge) and silicon (Si).

Preferably, the activator is at least one metallic element selected from the group consisting of transition metal elements and rare earth metal elements.

Preferably, the phosphor contains the metallic element in an amount of about 0.1–10 at. % based on yttrium (Y).

In a third aspect of the invention, there is provided an electroluminescent device employing, as a light-emitting layer, an oxide phosphor for use in an electroluminescent device as recited above.

Preferably, the light-emitting layer is a thin film.

BRIEF DESCRIPTION OF THE DRAWINGS

Various other objects, features, and many of the attendant advantages of the present invention will be readily appreciated as the same becomes better understood with reference to the following detailed description of the preferred embodiments when considered in connection with accompanying drawings, in which.

DETAILED DESCRIPTION OF PREFERRED EMBODIMENTS

Figure 1:
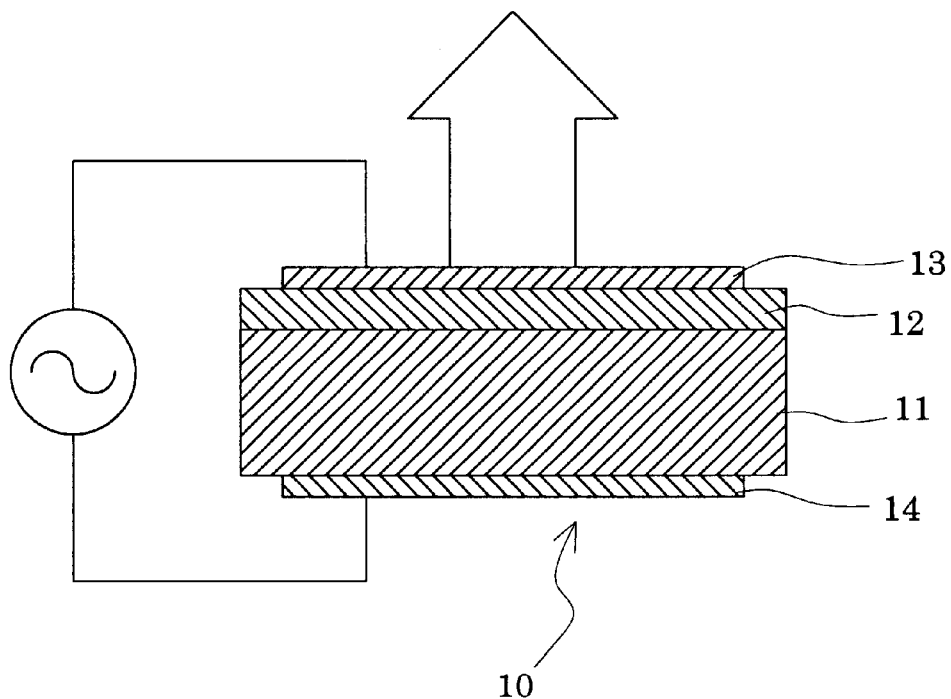
FIG. 1 shows a schematic, cross-sectional illustration, of a typical electroluminescent device.

The oxide phosphor for use in an electroluminescent device according to the first aspect of the invention comprises an yttrium (Y) oxide as a matrix and at least one transition metal element as an activator.

In other words, the matrix is formed of an yttrium oxide such as yttrium oxide ($Y_2O_3$), and a transition metal is employed as an activator.

Transition metals which can be used in the present invention include manganese (Mn), chromium (Cr), vanadium (V), cobalt (Co), copper (Cu), silver (Ag), tin (Sn), and titanium (Ti). These transition metals can be used singly or in combination of two or more species. In addition to the transition metal elements, a rare earth metal element can also be used in combination. Examples of the rare earth metal element which can be used include europium (Eu), terbium (Tb), cerium (Ce), thulium (Tm), neodymium (Nd), erbium (Er), holmium (Ho), ytterbium (Yb), samarium (Sm), dysprosium (Dy), and praseodymium (Pr).

The activator, serving as a luminescence center, is doped in an amount of about 0.1–10 at. %, preferably 0.5–3 at. %, based on yttrium (Y).

The oxide phosphor for use in an electroluminescent device according to the second aspect of the invention contains, as a matrix, a Y—Ge—O oxide containing yttrium (Y) and germanium (Ge).

Examples of the Y—Ge—O oxide serving as a matrix in the present invention include complex oxides such as yttrium oxide ($Y_2O_3$)-germanium oxide ($GeO_2$) and ternary compounds.

Examples of the ternary compounds include yttrium germanates such as $Y_2GeO_5$, $Y_2Ge_2O_7$, and $Y_4GeO_8$.

In the Y—Ge—O oxide of the present invention, germanium (Ge) is contained in an amount of 0.01–99 mol %, preferably 0.01–80 mol % based on the total amount of the Y—Ge—O oxide containing yttrium (Y) and germanium (Ge).

In the present invention, Y—Ge—Si—O oxide material, in which silicon (Si) is substituted for a part or a predominant part of germanium (Ge) in the above oxide, may also be employed as the matrix.

Examples of the Y—Ge—Si—O oxide material include complex oxides such as ($Y_2O_3$)-($GeO_2$)-silicon oxide ($SiO_2$).

In the present invention, when silicon (Si) is substituted for germanium (Ge), the amount of silicon (Si) based on the total mount of germanium (Ge) and silicon (Si) is 0.01–99 at. %, preferably 0.01–90 at. %.

The oxide phosphor of the second aspect of present invention for use in an electroluminescent device comprises a Y—Ge—O oxide as a matrix and at least one arbitrary metallic element as an activator. Examples of the metallic element include rare earth metal elements and transition metal elements.

Examples of the rare earth metal element include europium (Eu), terbium (Tb), cerium (Ce), thulium (Tm), neodymium (Nd), erbium (Er), holmium (Ho), ytterbium (Yb), samarium (Sm), dysprosium (Dy), and praseodymium (Pr). Examples of the transition metal element include manganese (Mn), chromium (Cr), vanadium (V), cobalt (Co), copper (Cu), silver (Ag), tin (Sn), titanium (Ti), The activator, serving as a luminescence center, is doped to the matrix in an amount of 0.1–10 at %, preferably 0.5–3 at. %, based on yttrium (Y).

The oxide phosphors of the first and second aspects of the present invention for use in an electroluminescent device can be produced by adding an activator (luminescence center) to a matrix and optimizing production conditions such as chemical composition of the matrix and firing conditions. The phosphors are formed into desired shapes, so as to be used as light-emitting layers to be incorporated in electroluminescent devices.

No particular limitation is imposed on the structure of the light-emitting layer employed in a thin-film EL device. Examples of the structure include generally known single-insulation thin film structure, double-insulation thin film structure, single-insulation structure employing a ceramic insulating layer, and double-insulation structure employing a thin film and a ceramic layer.

FIG. 1 shows a typical thin-film EL device of single-insulation thin film structure. As shown in FIG. 1, an oxide phosphor thin film (phosphor thin film) 12 according to the present invention for use in an electroluminescent device is formed on an insulating substrate 11 such as a $BaTiO_3$ substrate. On the phosphor thin film 12, transparent conductive film 13 such as ZnO:Al is provided through a method such as sputtering. On the backside of the insulating substrate 11, an electrode 14 such as Al-vapor-deposited film is provided, to thereby constitute an electroluminescent device 10.

In the electroluminescent device 10 of such structure, the phosphor thin film 12 causes light emission by application of a voltage of 500–600 V between the transparent conductive film 13 and the electrode 14.

The oxide phosphor thin film according to the present invention is formed through any known physical thin film deposition method such as sputtering, chemical vapor deposition (CVD), electron-beam vapor deposition, atomic layer epitaxy, or laser ablation, and subsequently, is subjected to heat treatment at comparatively low temperature in an atmosphere containing an inert gas and sulfur, in vacuum, or in an non-oxidizing gas atmosphere containing a non-oxidizing gas, sulfur, and an oxidizing gas or a reducing gas, to thereby impart, to the thin film, satisfactory performance for serving as a light-emitting layer of an electroluminescent device. The temperature of the heat treatment falls within the range of 850–1,100° C., preferably 950–1,050° C.

By virtue of high chemical stability of the oxide phosphor of the present invention, any known chemical film formation method making use of an aqueous solution may also be effectively employed. For example, a film is formed through a solution method or a sol-gel method, and subsequently, the film is subjected to heat treatment.

The oxide phosphor thin film which has been formed through any of the aforementioned thin film deposition methods has a thickness of 0.1–10 μm, preferably 0.5–3 μm. The EL device characteristics can be controlled and excellent multi-color and full-color light emissions can be attained by setting appropriate conditions employed in the chosen film formation methods.

Examples of the electrodes which are formed through the aforementioned thin film methods include transparent conductive films such as ZnO:Al, $SnO_2$:F, $SnO_2$:Sb, and indium tin oxide (ITO). Although the insulating layer can be formed of $BaTiO_3$, other materials can also be used so long as they have a dielectric constant of at least 100 and are durable for heat treatment at approximately 900° C. No particular limitation is imposed on the structure of the device. Needless to say, ceramics having a heat resistance to 900° C. or more such as quartz and alumina, and single-crystal substrates such as sapphire can be used as a substrate material, and conventional double-insulation structure can be employed.

The method for forming phosphor thin film is not particularly limited to the aforementioned methods. Regarding heat treatment, conventional oxide phosphors for use in an EL device must be heated at comparatively high temperature, in excess of 1,000° C., so as to attain high luminance. However, since the oxide phosphor matrices of the present invention—Y—Ge—O and Y—Ge—Si— contain Ge, phosphor thin film of excellent crystallinity can be obtained through heat treatment at comparatively low temperature approximately 1,000° C., to thereby attain emission of high luminance.

Since the aforementioned matrices are readily crystallized through heat treatment at comparatively low temperature, approximately 900–950° C., in an inert gas atmosphere, a phosphor of high crystallinity can be produced at comparatively low temperature. As a result, in the EL device employing the phosphor in a light-emitting layer, efficiency of generation of hot electrons during application of high-intensity electric field is enhanced, to thereby greatly improve efficiency of excitation of a luminescence center and attain high luminance of emission.

EXAMPLES

The present invention will next be described in detail by way of examples, which should not be construed as limiting the invention thereto.

Example 1

Manganese dioxide ($MnO_2$) powder serving as an activator source was added to $Y_2O_3$ powder in an amount such that the Mn content (based on Y) accounted for approximately 2 at. %, and the mixture was mixed thoroughly. The resultant mixture was calcined at 900° C. in an argon (Ar) gas atmosphere for one hour, to thereby prepare an oxide phosphor, Mn-doped yttrium oxide ($Y_2O_3$:Mn). From the calcined phosphor powder, a sputtering target was produced. The target was sputtered onto a sintered barium titanate ($BaTiO_3$) ceramic substrate, which also serves as an insulating layer, in argon (Ar) gas under the following conditions: gas pressure (6 Pa); input power for sputtering (100 W); substrate temperature (275–390° C.); and substrate-target distance (25 mm); to thereby form $Y_2O_3$:Mn phosphor thin film serving as a light-emitting layer. The thus-formed thin film was annealed at 1,020° C. for one hour in an argon (Ar) gas atmosphere containing sulfur (S).

Figure 2:
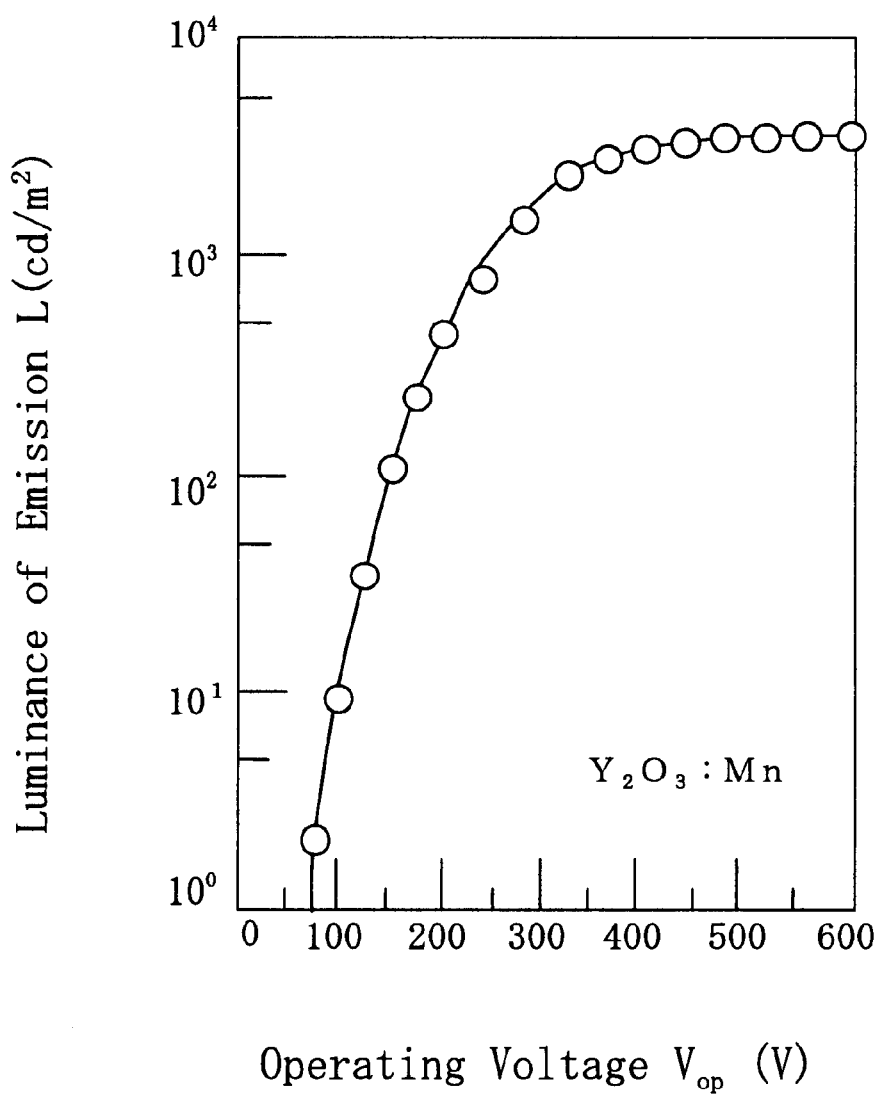
FIG. 2 is a graphical illustration of the relationship of luminance vs. operating voltage obtained in Example 1.

On the thin film serving as a light-emitting layer, a transparent electrode comprising aluminum-added zinc oxide (ZnO:Al) was formed, and a metallic (Al) electrode was formed on the back side of the substrate, to thereby fabricate an EL device. When sinusoidal AC voltage (1 kHz) was applied to the EL device, yellow light emission of a high luminance of 3,480 $cd/m^2$ was attained at an operating voltage of 600 V as shown in FIG. 2. Thus, the $Y_2O_3$:Mn phosphor thin film has been proven to satisfactorily function as a light-emitting layer to be employed in the EL device.

Example 2

Manganese dioxide ($MnO_2$) powder serving as an activator source was added to $Y_2O_3$ powder in an amount such that the Mn content (based on Y) accounted for approximately 1 at. %, and the mixture was mixed thoroughly. The resultant mixture was fired at 900° C. in an argon (Ar) gas atmosphere for one hour, to thereby prepare an oxide phosphor, Mn-added yttrium oxide ($Y_2O_3$:Mn). From the thus-fired phosphor powder, a sputtering target was produced. An transparent electrode comprising antimony-added zinc oxide ($SnO_2$:Sb) was grown on a single-crystal sapphire substrate. The target was sputtered onto the thus-prepared substrate in argon (Ar) gas under the following conditions: gas pressure (6 Pa); input power for sputtering (100 W); substrate temperature (250–800° C.); and substrate-target distance (25 mm); to thereby form $Y_2O_3$:Mn phosphor thin film serving as a light-emitting layer. The thus-formed thin film was annealed at 1,050° C. for one hour in an argon (Ar) gas atmosphere containing sulfur (S).

On the thin film serving as a light-emitting layer, a transparent electrode comprising aluminum-added zinc oxide (ZnO:Al), or a metallic (Al) electrode was formed, to thereby fabricate an EL device. When sinusoidal AC voltage (1 kHz) was applied to the EL device, yellow light emission of high luminance which was sufficiently acceptable in practice was attained by applying low voltage. Thus, the $Y_2O_3$:Mn phosphor thin film has been proven to satisfactorily function as a light-emitting layer to be employed in the thin-film EL device employing a single-crystal substrate. The thin film without the above-mentioned annealed treatment has been proven to satisfactorily function as a light-emitting layer.

Example 3

Chromium dioxide ($CrO_2$) powder serving as an activator source was added to $Y_2O_3$ in an amount such that the Cr content (based on Y) accounted for approximately 1 at. %, and the mixture was mixed thoroughly. The resultant mixture was fired at 900° C. in an argon (Ar) gas atmosphere for one hour, to thereby prepare an oxide phosphor, Cr-added yttrium oxide ($Y_2O_3$:Cr). From the thus-fired phosphor powder, a sputtering target was produced. The target was sputtered onto a sintered barium titanate ($BaTiO_3$) ceramic substrate, which also serves as an insulating layer, in argon (Ar) gas under the following conditions: gas pressure (6 Pa); input power for sputtering (100 W); substrate temperature (275° C.); and substrate-target distance (25 mm); to thereby form $Y_2O_3$:Cr phosphor thin film serving as a light-emitting layer. The thus-formed thin film was annealed at 1,050° C. for one hour in an argon (Ar) gas atmosphere containing sulfur (S).

On the thin film serving as a light-emitting layer, a transparent electrode comprising aluminum-added zinc oxide (ZnO:Al) was formed, and a metallic (Al) electrode was formed on the back side of the substrate, to thereby fabricate an EL device. When sinusoidal AC voltage (1 kHz) was applied to the EL device, red light emission of a luminance of 6 $cd/m^2$ was attained at an operating voltage of 600 V. Thus, the $Y_2O_3$:Cr phosphor thin film has been proven to satisfactorily function as a light-emitting layer to be employed in the EL device.

Example 4

Manganese dioxide ($MnO_2$) powder and europium oxide ($Eu_2O_3$) powder serving as activator sources were added to $Y_2O_3$ powder in amounts such that the Mn content (based on Y) accounted for approximately 1 at. % and the Eu content (based on Y) accounted for approximately 0.5 at. %, and the mixture was mixed thoroughly. The resultant mixture was fired at 900° C. in an argon (Ar) gas atmosphere for one hour, to thereby prepare an phosphor, Mn- and Eu-added yttrium oxide ($Y_2O_3$:Mn,Eu). From the thus-fired phosphor powder, a sputtering target was produced. The target was sputtered onto a sintered barium titanate ($BaTiO_3$) ceramic substrate, which also serves as an insulating layer, in argon (Ar) gas under the following conditions: gas pressure (6 Pa); input power for sputtering (100 W); substrate temperature (275° C.); and substrate-target distance (25 mm); to thereby form $Y_2O_3$:Mn,Eu phosphor thin film serving as a light-emitting layer. The thus-formed thin film was annealed at 1,020° C. for one hour in an argon (Ar) gas atmosphere containing sulfur (S).

On the thin film serving as a light-emitting layer, a transparent electrode comprising aluminum-added zinc oxide (ZnO:Al) was formed, and a metallic (Al) electrode was formed on the back side of the substrate, to thereby fabricate an EL device. When sinusoidal AC voltage (1 kHz) was applied to the EL device, red light emission of a high luminance which was sufficiently acceptable in practice was attained at an operating voltage of 450 V. Thus, the $Y_2O_3$:Mn,Eu phosphor thin film has been proven to satisfactorily function as a light-emitting layer to be employed in the EL device.

Example 5

$Y_2O_3$ powder and $GeO_2$ powder were mixed such that the mole ratio accounts for 1:1 (Y:Ge=2:1). Manganese dioxide ($MnO_2$) powder serving as an activator source was added to the mixed powder in an amount such that the Mn content (based on Y) accounted for approximately 1 at. %, and the mixture was mixed thoroughly. The resultant mixture was fired at 900° C. in an argon (Ar) gas atmosphere for one hour, to thereby prepare an oxide phosphor, Mn-added Y—Ge—O oxide phosphor. The phosphor assumed a mixture phase of yttrium oxide ($Y_2O_3$) and germanium oxide ($GeO_2$).

From the thus-fired phosphor powder, a sputtering target was produced. The target was sputtered onto a sintered barium titanate ($BaTiO_3$) ceramic substrate, which also serves as an insulating layer, in argon (Ar) gas under the following conditions: gas pressure (6 Pa); input power for sputtering (100 W); substrate temperature (275° C.); and substrate-target distance (25 mm); to thereby form Mn-added Y—Ge—O oxide phosphor thin film serving as a light-emitting layer. The thus-formed thin film was annealed at 970° C. for one hour in an argon (Ar) gas atmosphere containing sulfur (S).

Figure 3:
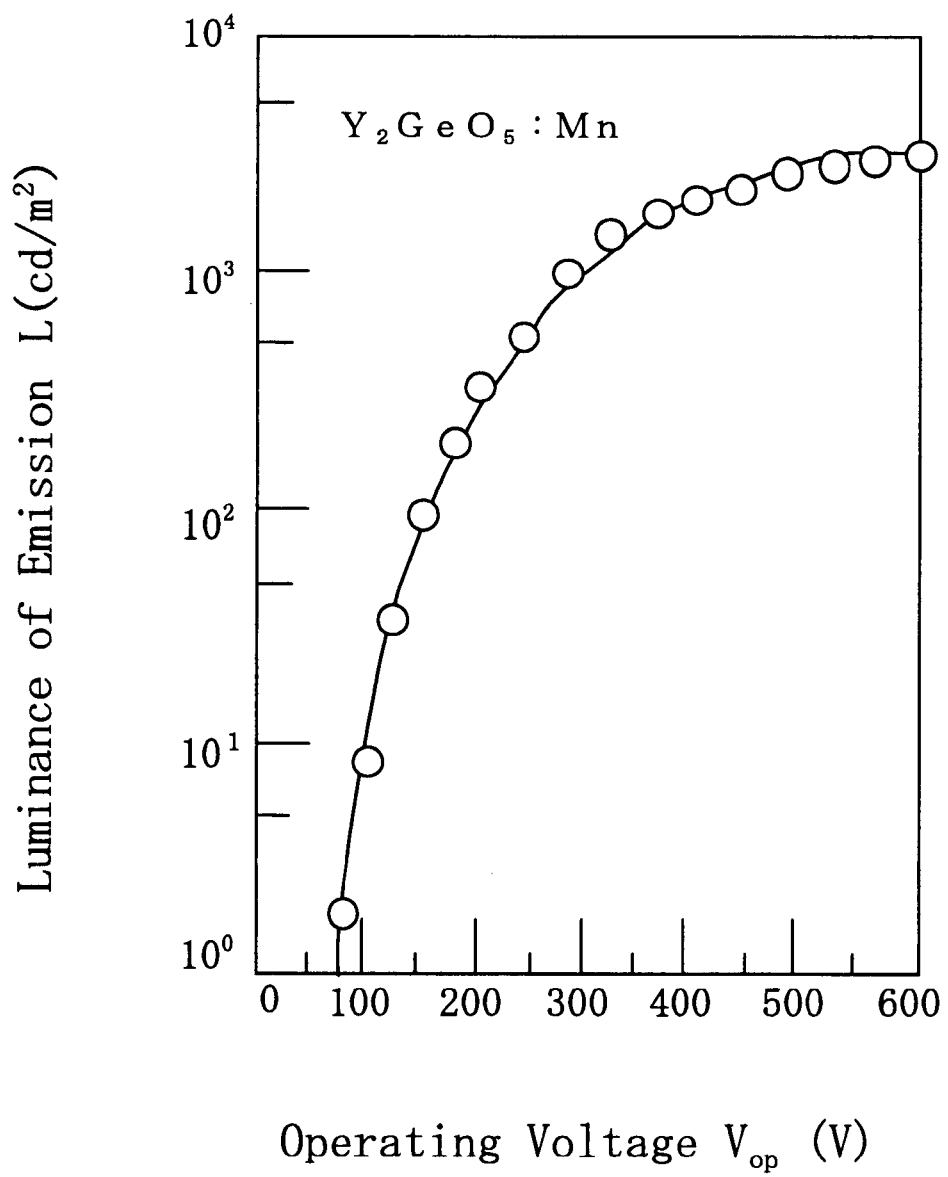
FIG. 3 is a graphical illustration of the relationship of luminance vs. operating voltage obtained in Example 5.

On the thin film serving as a light-emitting layer, a transparent electrode comprising aluminum-added zinc oxide (ZnO:Al) was formed, and a metallic (Al) electrode was formed on the back side of the substrate, to thereby fabricate an EL device. When sinusoidal AC voltage (1 kHz) was applied to the EL device, yellow light emission of a high luminance of 3,020 cd/m$^2$ was attained at an operating voltage of 450 V as shown in FIG. 3. Thus, the phosphor thin film predominantly comprising $Y_2GeO_5$:Mn has been proven to satisfactorily function as a light-emitting layer to be employed in the EL device.

Example 6

$Y_2O_3$ powder and $GeO_2$ powder were mixed such that the mole ratio accounted for 1:1 (Y:Ge—2:1). Cerium dioxide ($CeO_2$) powder serving as an activator source was added to the mixed powder in an amount such that the Ce content (based on Y) accounted for approximately 1 at. %, and the mixture was mixed thoroughly. The resultant mixture was fired at 900° C. in an argon (Ar) gas atmosphere for one hour, to thereby prepare a phosphor comprising $Y_2GeO_5$:Ce oxide. Through X-ray analysis, the thus-prepared phosphor has been found to assume a mixture phase of yttrium oxide ($Y_2O_3$) and germanium oxide ($GeO_2$). From the thus-fired phosphor powder, a sputtering target was produced.

The target was sputtered onto a sintered barium titanate ($BaTiO_3$) ceramic substrate, which also serves as an insulating layer, in argon (Ar) gas under the following conditions: gas pressure (6 Pa); input power for sputtering (100 W); substrate temperature (275° C.); and substrate-target distance (25 mm); to thereby form a phosphor thin film predominantly comprising $Y_2GeO_5$:Mn serving as a light-emitting layer. The thus-formed thin film was annealed at 1,035° C. for one hour in an argon (Ar) gas atmosphere containing sulfur (S).

Figure 4:
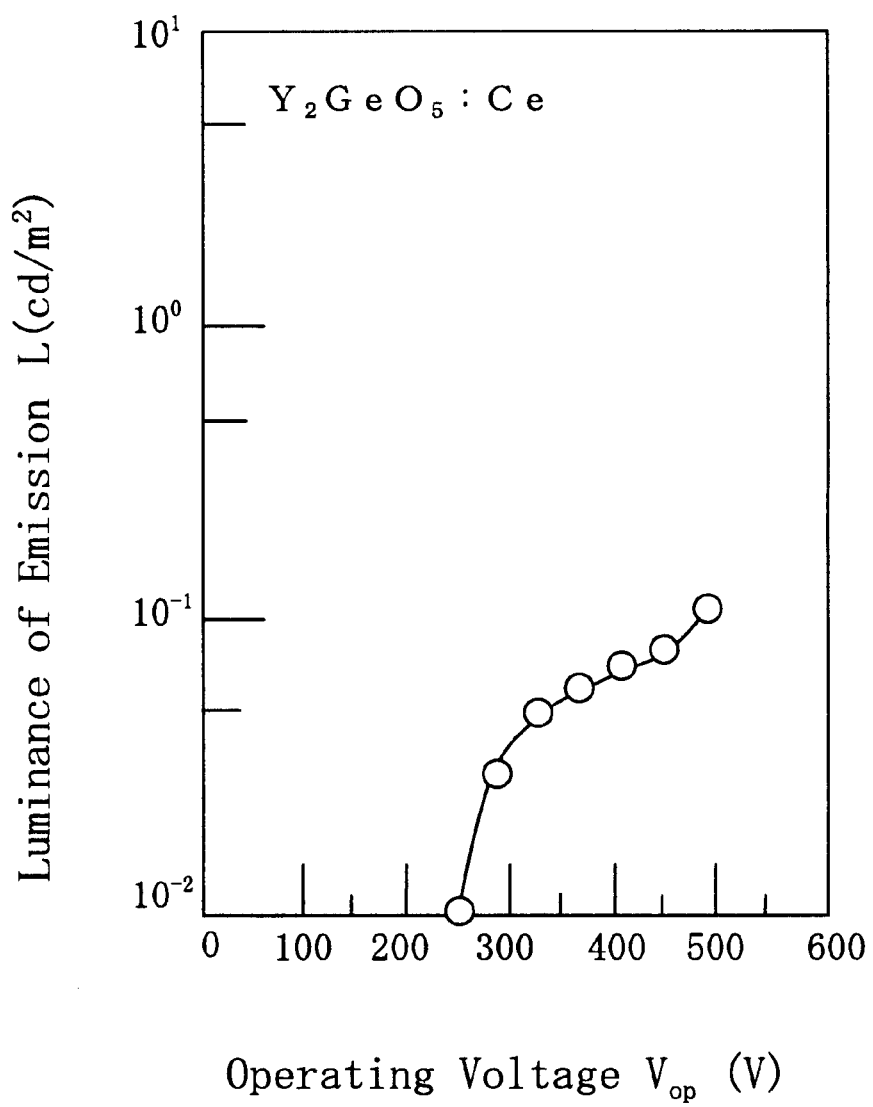
FIG. 4 is a graphical illustration of the relationship of luminance vs. operating voltage obtained in Example 6.

On the thin film serving as a light-emitting layer, a transparent electrode comprising aluminum-added zinc oxide (ZnO:Al) was formed, and a metallic (Al) electrode was formed on the back side of the substrate, to thereby fabricate an EL device. When sinusoidal AC voltage (1 kHz) was applied to the EL device, blue light emission of a luminance of 0.11 cd/m$^2$ was attained at an operating voltage of 500 V as shown in FIG. 4.

Thus, the phosphor thin film predominantly comprising $Y_2GeO_5$:Ce has been proven to satisfactorily function as a light-emitting layer to be employed in the EL device.

Example 7

$Y_2O_3$ powder and $GeO_2$ powder serving as matrix sources of an oxide phosphor were mixed such that the mole ratio accounted for 2:1 (Y:Ge=4:1). Manganese dioxide ($MnO_2$) powder serving as an activator source was added to the mixed powder in an amount such that the Mn content (based on Y) accounted for approximately 1 at. %, and the mixture was mixed thoroughly. The resultant mixture was fired at 900° C. in an argon (Ar) gas atmosphere for one hour, to thereby prepare a phosphor comprising $Y_4GeO_8$:Mn oxide.

From the thus-fired phosphor powder, a sputtering target was produced. The target was sputtered onto a sintered barium titanate ($BaTiO_3$) ceramic substrate, which also serves as an insulating layer, in argon (Ar) gas under the following conditions: gas pressure (6 Pa); input power for sputtering (100 W); substrate temperature (275° C.); and substrate-target distance (25 mm); to thereby form a phosphor thin film predominantly comprising Mn-added $Y_4GeO_8$:Mn serving as a light-emitting layer. The thus-formed thin film was annealed at 1,020° C. for one hour in an argon (Ar) gas atmosphere containing sulfur (S).

Figure 5:
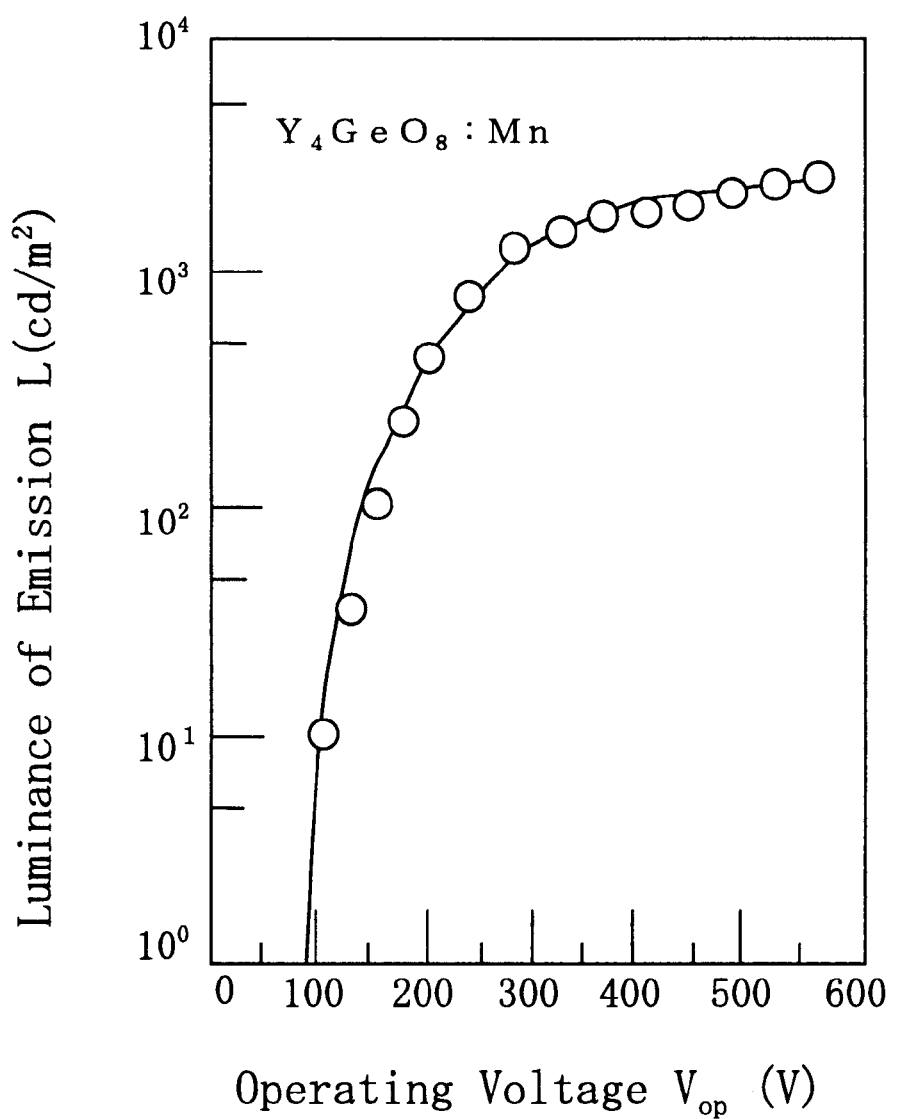
FIG. 5 is a graphical illustration of the relationship of luminance vs. operating voltage obtained in Example 7.

On the thin film serving as a light-emitting layer, a transparent electrode comprising aluminum-added zinc oxide (ZnO:Al) was formed, and a metallic (Al) electrode was formed on the back side of the substrate, to thereby fabricate an EL device. When sinusoidal AC voltage (1 kHz) was applied to the EL device, yellow light emission of a luminance of 2,500 cd/m$^2$ was attained at an operating voltage of 560 V as shown in FIG. 5. Thus, the phosphor thin film predominantly comprising $Y_4GeO_8$:Mn has been proven to satisfactorily function as a light-emitting layer to be employed in the EL device.

Example 8

$Y_2O_3$ powder and $GeO_2$ powder serving as matrix sources of an oxide phosphor were mixed such that the mole ratio accounted for 2:1 (Y:Ge=4:1). Cerium dioxide ($CeO_2$) powder serving as an activator source was added to the mixed powder in an amount such that the Ce content (based on Y) accounted for approximately 1 at. %, and the mixture was mixed thoroughly. The resultant mixture was fired at 900° C. in an argon (Ar) gas atmosphere for one hour. From the thus-fired powder, a sputtering target was produced.

The target was sputtered onto a sintered barium titanate ($BaTiO_3$) ceramic substrate, which also serves as an insulating layer, in argon (Ar) gas under the following conditions: gas pressure (6 Pa); input power for sputtering (100 W); substrate temperature (275° C.); and substrate-target distance (25 mm); to thereby form phosphor thin film predominantly comprising $Y_4GeO_8$:Ce and serving as a light-emitting layer. The thus-formed thin film was annealed at 1,020° C. for one hour in an argon (Ar) gas atmosphere containing sulfur (S).

On the thin film serving as a light-emitting layer, a transparent electrode comprising aluminum-added zinc oxide (ZnO:Al) was formed, and a metallic (Al) electrode was formed on the back side of the substrate, to thereby fabricate an EL device.

Figure 6:
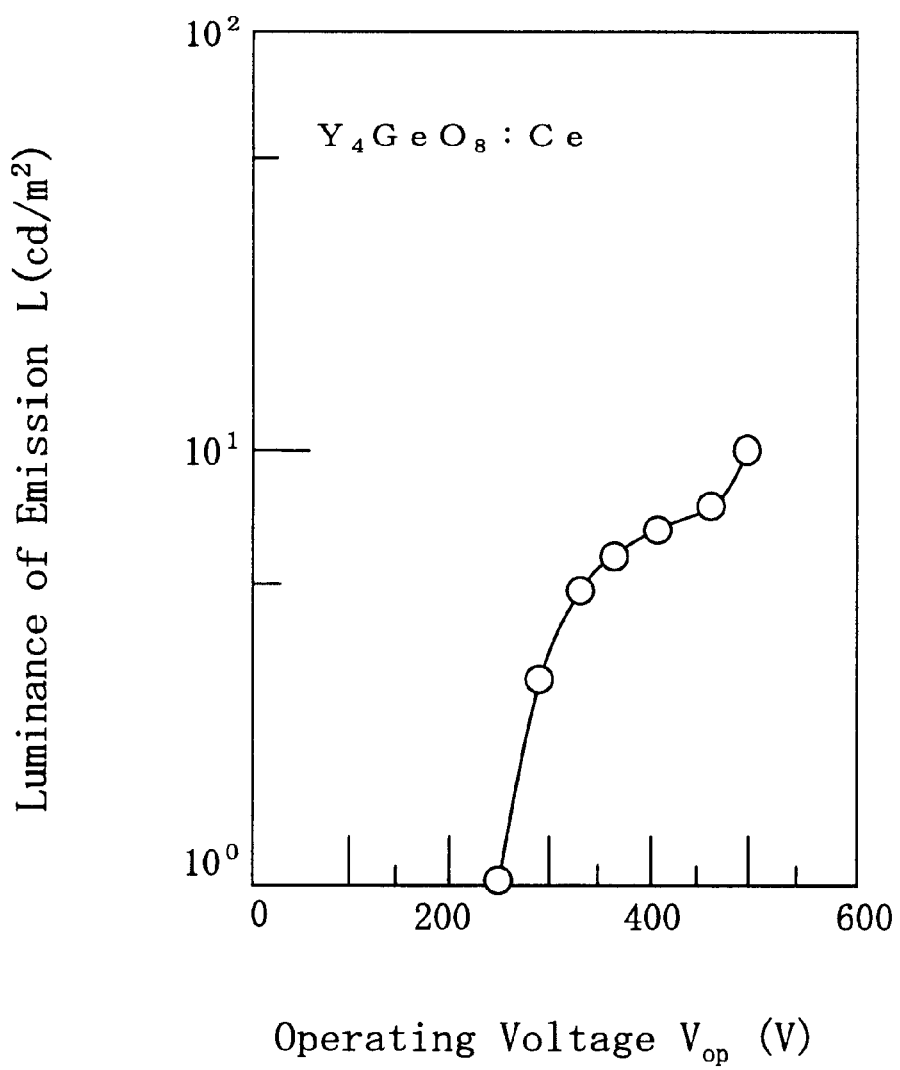
FIG. 6 is a graphical illustration of the relationship of luminance vs. operating voltage obtained in Example 8.

When sinusoidal AC voltage (1 kHz) was applied to the EL device, blue light emission of a luminance which was acceptable in practice was attained at an operating voltage of 475 V as shown in FIG. 6.

Thus, the phosphor thin film predominantly comprising $Y_4GeO_8$:Ce has been proven to satisfactorily function as a light-emitting layer to be employed in the EL device. The crystal structure of the thin film was analyzed through X-ray diffractometry. The results indicated that the thin film predominantly contained $Y_4GeO_8$ with $Y_2Ge_2O_7$ and $Y_2GeO_5$ phases may be formed depending on heat treatment conditions.

Example 9

$Y_2O_3$ powder and $GeO_2$ powder serving as matrix sources of an oxide phosphor were mixed such that the mole ratio accounted for 1:2 (Y:Ge=1:1). Manganese dioxide ($MnO_2$) powder serving as an activator source was added to the mixed powder in an amount such that the Mn content (based on Y) accounted for approximately 1 at. %, and the mixture was mixed thoroughly. The resultant mixture was fired at 900° C. in an argon (Ar) gas atmosphere for one hour. From the thus-fired powder, a sputtering target was produced.

The target was sputtered onto a sintered barium titanate ($BaTiO_3$) ceramic substrate, which also serves as an insulating layer, in argon (Ar) gas under the following conditions: gas pressure (6 Pa); input power for sputtering (100 W); substrate temperature (275° C.); and substrate-target distance (25 mm); to thereby form phosphor thin film predominantly comprising $Y_2Ge_2O_7$:Mn and serving as a light-emitting layer. The thus-formed thin film was annealed at 1,020° C. for one hour in an argon (Ar) gas atmosphere containing sulfur (S).

On the thin film serving as a light-emitting layer, a transparent electrode comprising aluminum-added zinc oxide (ZnO:Al) was formed, and a metallic (Al) electrode was formed on the back side of the substrate, to thereby fabricate an EL device.

Figure 7:
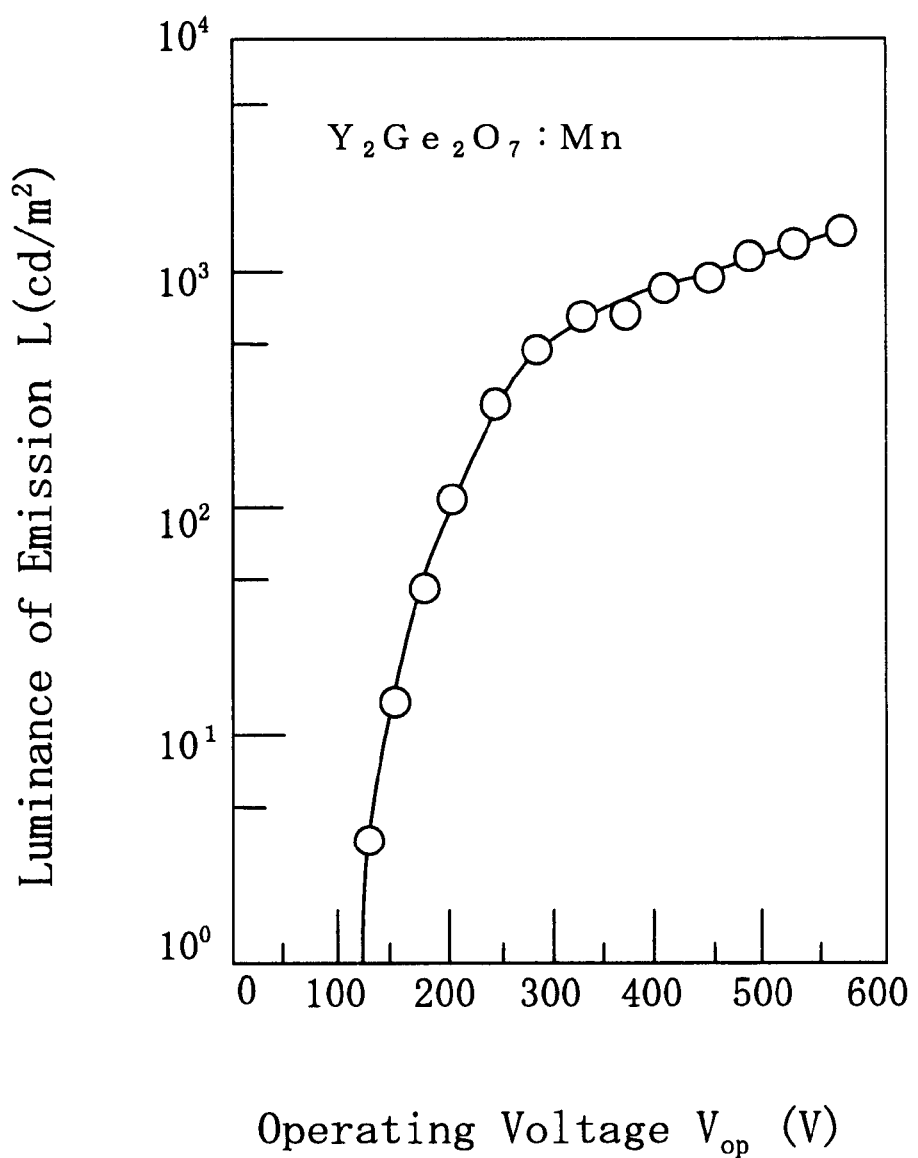
FIG. 7 is a graphical illustration of the relationship of luminance vs. operating voltage obtained in Example 9.

When sinusoidal AC voltage (1 kHz) was applied to the EL device, yellow light emission of a high luminance of 1,629 cd/m² which was attained at an operating voltage of 475 V as shown in FIG. 7.

Thus, the phosphor thin film predominantly comprising $Y_2Ge_2O_7$:Mn has been proven to satisfactorily function as a light-emitting layer to be employed in the EL device.

By adding employing Y—Ge—O phosphors to which other rare earth metal elements had been added as activators, multi-color emission of a luminance which was acceptable in practice was able to be attained. Table 1 shows phosphor materials employed.

TABLE 1

| Phosphor materials | Emission color |
| --- | --- |
| $Y_2GeO_5$:Eu | Orange |
| $Y_2GeO_5$:Nd | Orange |
| $Y_2GeO_5$:Sm | Red |
| $Y_2GeO_5$:Tb | Green |
| $Y_2GeO_5$:Ce | Blue |
| $Y_2GeO_5$:Pr | Green |
| $Y_2GeO_5$:Tm | Green |

Example 10

$Y_2O_3$ powder, $GeO_2$ powder, and $SiO_2$ powder serving as matrix sources of an oxide phosphor were mixed such that the proportion by mol accounted for 2:1:1 (Y:Ge:Si=4:1:1). Manganese dioxide ($MnO_2$) powder serving as an activator source was added to the mixed powder in an amount such that the Mn content (based on Y) accounted for approximately 1 at. %, and the mixture was mixed thoroughly. The resultant mixture was fired at 900° C. in an argon (Ar) gas atmosphere for one hour. From the thus-fired powder, a sputtering target was produced.

The target was sputtered onto a sintered barium titanate ($BaTiO_3$) ceramic substrate, which also serves as an insulating layer, in argon (Ar) gas under the following conditions: gas pressure (6 Pa); input power for sputtering (100 W); substrate temperature (275° C.); and substrate-target distance (25 mm); to thereby form Mn-added Y—Ge—Si—O phosphor thin film serving as a light-emitting layer. The thus-formed thin film was annealed at 1,050° C. for one hour in an argon (Ar) gas atmosphere containing sulfur (S).

On the thin film serving as a light-emitting layer, a transparent electrode comprising aluminum-added zinc oxide (ZnO:Al) was formed, and a metallic (Al) electrode was formed on the back side of the substrate, to thereby fabricate an EL device. When sinusoidal AC voltage (1 kHz) was applied to the EL device, yellow light emission of a high luminance of 300 cd/m² was attained at an operating voltage of 400 V.

Thus, the Mn-added Y—Ge—Si—O oxide phosphor has been proven to satisfactorily function as a light-emitting layer to be employed in the EL device.

Example 11

$Y_2O_3$ powder, $GeO_2$ powder, and $SiO_2$ powder serving as matrix sources of an oxide phosphor were mixed such that the proportion by mol accounted for 2:1:1 (Y:Ge:Si=4:1:1). Cerium dioxide ($CeO_2$) powder serving as an activator source was added to the mixed powder in an amount such that the Ce content (based on Y) accounted for approximately 1 at. %, and the mixture was mixed thoroughly. The resultant mixture was fired at 900° C. in an argon (Ar) gas atmosphere for one hour. From the thus-fired powder, a sputtering target was produced.

The target was sputtered onto a sintered barium titanate ($BaTiO_3$) ceramic substrate, which also serves as an insulating layer, in argon (Ar) gas under the following conditions: gas pressure (6 Pa); input power for sputtering (100 W); substrate temperature (275° C.); and substrate-target distance (25 mm); to thereby form Ce-added Y—Ge—Si—O phosphor thin film serving as a light-emitting layer. The thus-formed thin film was annealed at 1,050° C. for one hour in an argon (Ar) gas atmosphere containing sulfur (S).

Figure 8:
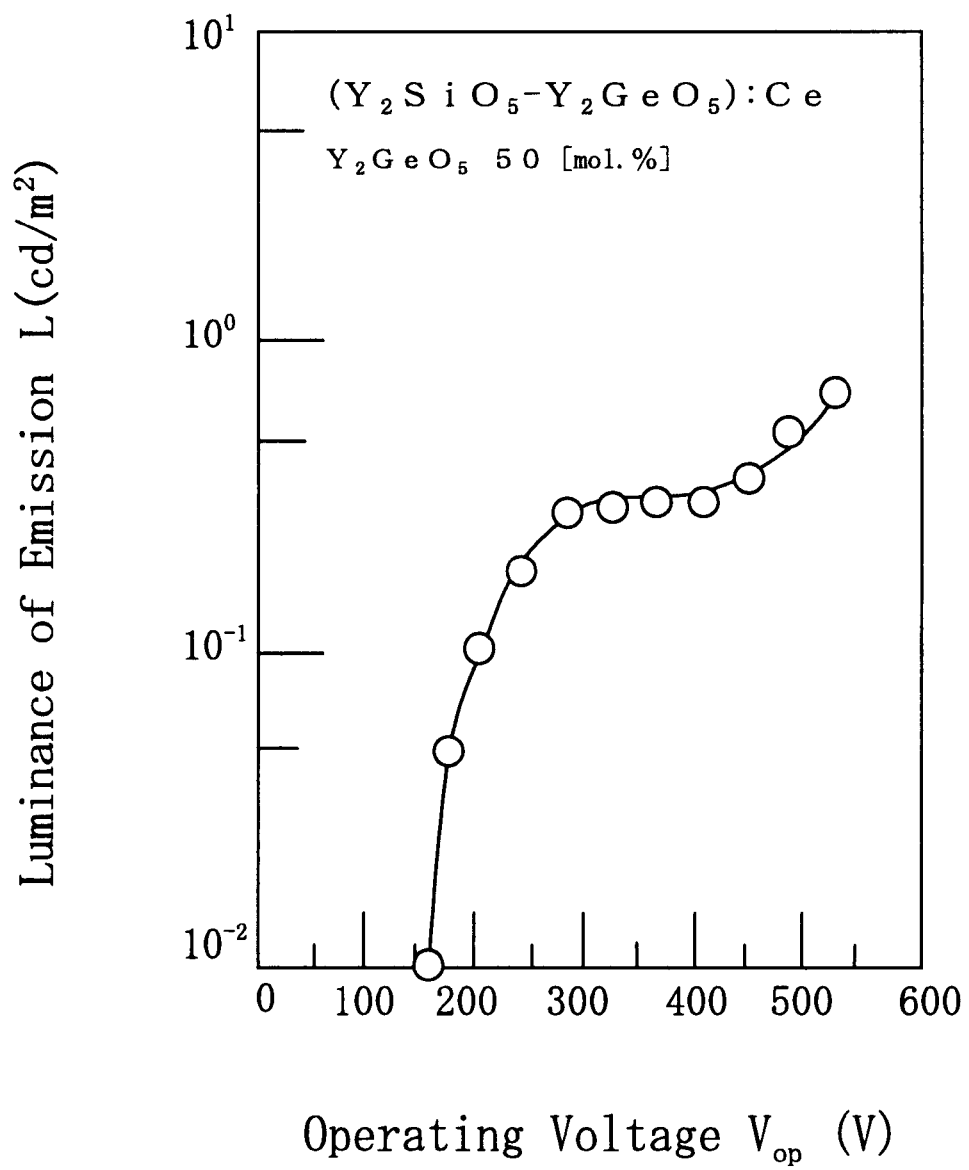
FIG. 8 is a graphical illustration of the relationship of luminance vs. operating voltage obtained in Example 11.

On the thin film serving as a light-emitting layer, a transparent electrode comprising aluminum-added zinc oxide (ZnO:Al) was formed, and a metallic (Al) electrode was formed on the back side of the substrate, to thereby fabricate an EL device. When sinusoidal AC voltage (1 kHz) was applied to the EL device, blue light emission of a luminance of 4.5 cd/m$^2$ was attained at an operating voltage of 450 V as shown in FIG. 8.

Thus, the Ce-added Y—Ge—Si—O phosphor has been proven to satisfactorily function as a light-emitting layer to be employed in the EL device.

Example 12

Figure 9:
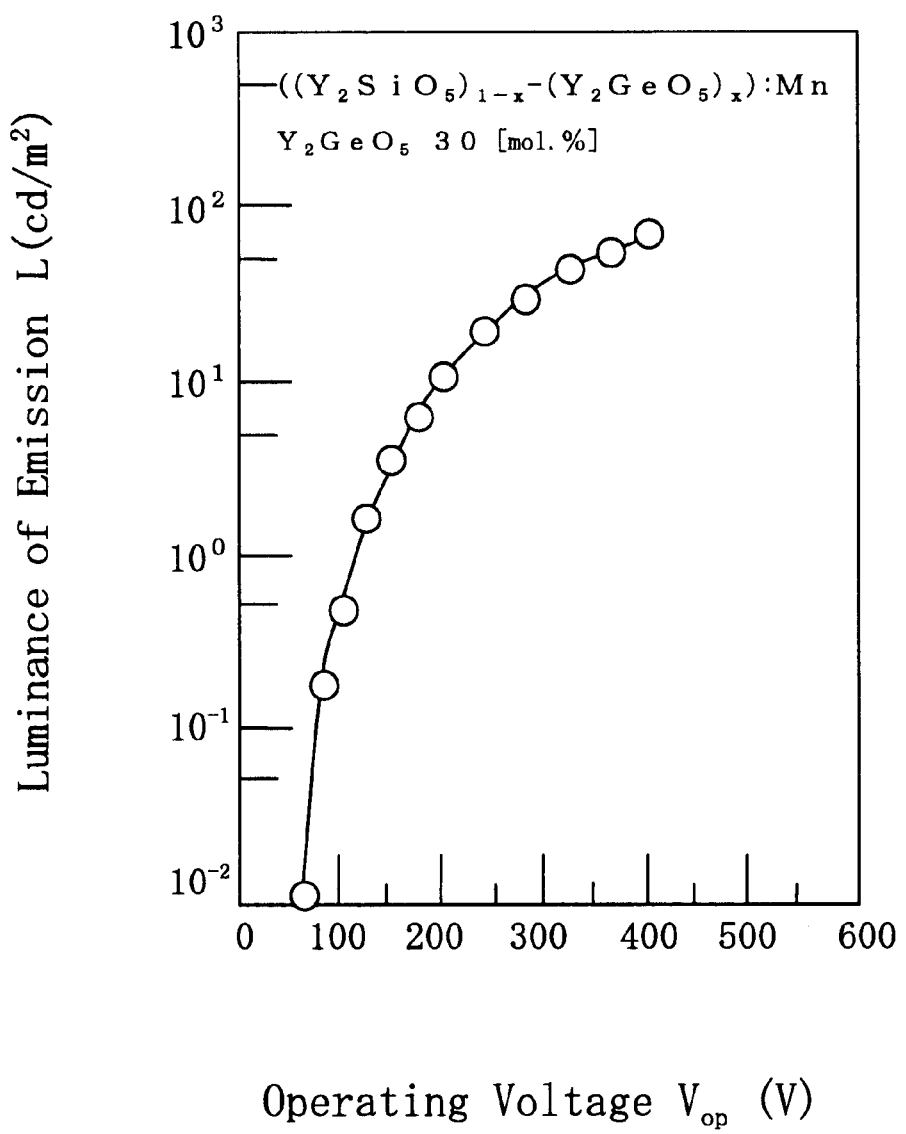
FIG. 9 is a graphical illustration of the relationship of luminance vs. operating voltage obtained in Example 12.

$Y_2GeO_5$ powder and $Y_2SiO_5$ powder serving as matrix sources of an oxide phosphor were mixed such that the mole ratio accounted for 0.3:0.7 (Y:Ge:Si=20:3:7). Manganese dioxide ($MnO_2$) powder serving as an activator source was added to the mixed powder in an amount such that the Mn content (based on Y) accounted for approximately 1 at. %, and the mixture was mixed thoroughly. The resultant mixture was fired at 900° C. in an argon (Ar) gas atmosphere for one hour. From the thus-fired powder, a sputtering target was produced. The target was sputtered onto a sintered barium titanate ($BaTiO_3$) ceramic substrate, which also serves as an insulating layer, in argon (Ar) gas under the following conditions: gas pressure (6 Pa); input power for sputtering (100 W); substrate temperature (275° C.); and substrate-target distance (25 mm); to thereby form Mn-added ($Y_2GeO_5$—$Y_2SiO_5$) phosphor thin film serving as a light-emitting layer. The thus-formed thin film was annealed at 1,020° C. for one hour in an argon (Ar) gas atmosphere. On the thin film serving as a light-emitting layer, a transparent electrode comprising aluminum-added zinc oxide (ZnO:Al) was formed, and a metallic (Al) electrode was formed on the back side of the substrate, to thereby fabricate an EL device. When sinusoidal AC voltage (1 kHz) was applied to the EL device, yellow light emission of a luminance of 90 cd/m$^2$ was attained at an operating voltage of 400 V as shown in FIG. 9. Thus, the Mn-added ($Y_2GeO_5$—$Y_2SiO_5$) phosphor has been proven to satisfactorily function as a light-emitting layer to be employed in the EL device.

Example 13

$Y_2GeO_5$ powder and $Y_2SiO_5$ powder serving as matrix sources of an oxide phosphor were mixed such that the mole ratio accounted for 0.3:0.7 (Y:Ge:Si=20:3:7). Cerium dioxide ($CeO_2$) powder serving as an activator source was added to the mixed powder in an amount such that the Ce content (based on Y) accounted for approximately 1 at. %, and the mixture was mixed thoroughly. The resultant mixture was fired at 900° C. in an argon (Ar) gas atmosphere for one hour. From the thus-fired powder, a sputtering target was produced.

The target was sputtered onto a sintered barium titanate ($BaTiO_3$) ceramic substrate, which also serves as an insulating layer, in argon (Ar) gas under the following conditions: gas pressure (6 Pa); input power for sputtering (100 W); substrate temperature (275° C.); and substrate-target distance (25 mm); to thereby form Ce-added ($Y_2GeO_5$—$Y_2SiO_5$) phosphor thin film serving as a light-emitting layer. The thus-formed thin film was annealed at 1,050° C. for one hour in an argon (Ar) gas atmosphere containing sulfur (S).

Figure 10:
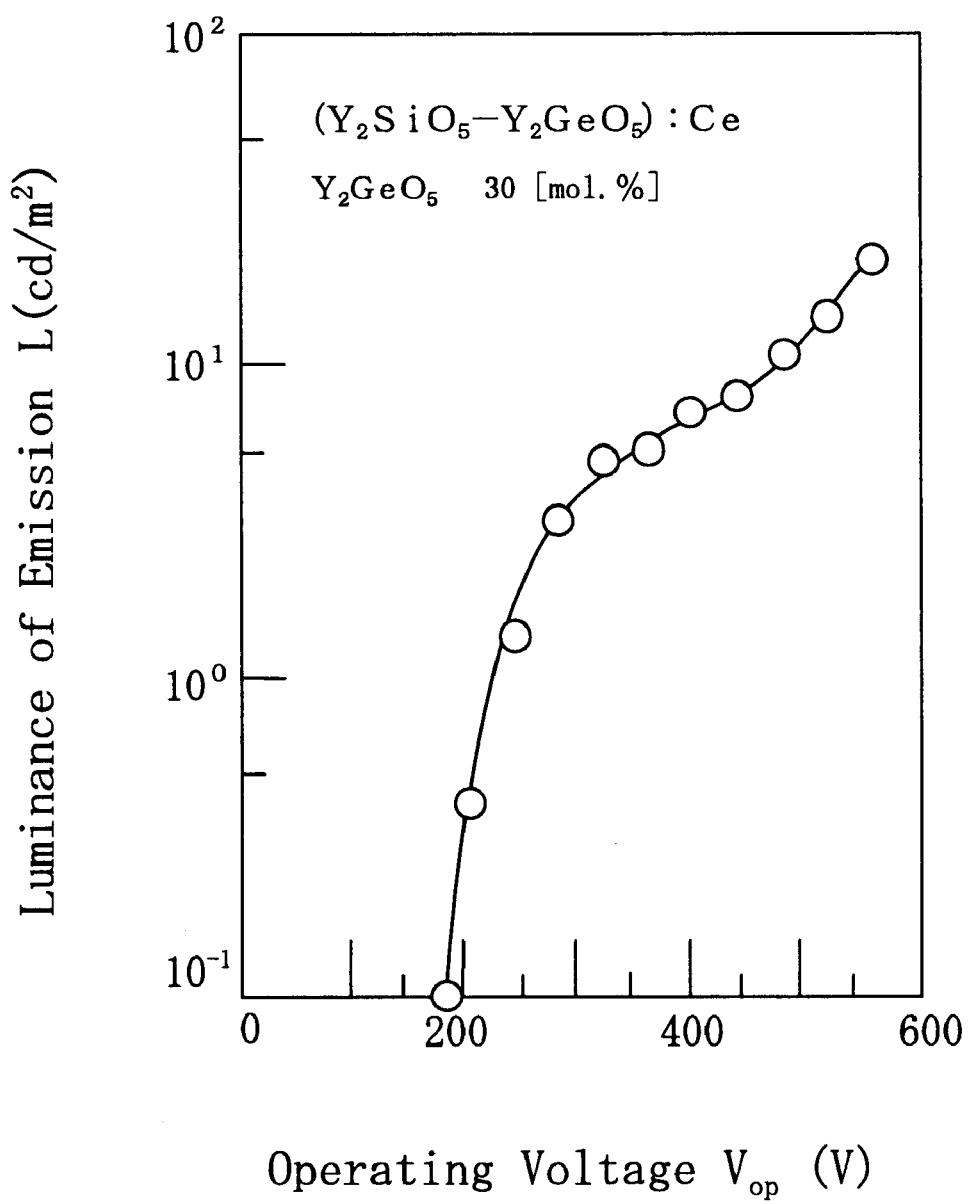
FIG. 10 is a graphical illustration of the relationship of luminance vs. operating voltage obtained in Example 13.

On the thin film serving as a light-emitting layer, a transparent electrode comprising aluminum-added zinc oxide (ZnO:Al) was formed, and a metallic (Al) electrode was formed on the back side of the substrate, to thereby fabricate an EL device. When sinusoidal AC voltage (1 kHz) was applied to the EL device, blue light emission of a luminance of 2 cd/m$^2$ was attained at an operating voltage of 550 V as shown in FIG. 10.

Thus, the Ce-added ($Y_2GeO_5$—$Y_2SiO_5$) phosphor has been proven to satisfactorily function as a light-emitting layer to be employed in the EL device.

As is clear from the description hereinabove, by adding a transition metal serving as an activator to an yttrium (Y) oxide serving as a matrix, or by adding at least one arbitrary element selected from transition metal elements and rare earth elements serving as an activator to Y—Ge—O, Y—Ge—Si—O, and a complex oxide of Y oxide and Ge oxide serving as matrices, an yttrium (Y) oxide phosphor or a Y—Ge—O oxide and Y—Ge—Si—O oxide phosphors can be produced at low costs without need for special treatment for removing moisture or treatment at high temperature which has conventionally been carried out so as to attain high luminance. Thus, light-emitting layers which are sufficiently acceptable in practice for use in multi-color or full-color EL devices can be provided.

What is claimed is:

1. An oxide phosphor for use in an electroluminescent device, which phosphor comprises an yttrium (Y) oxide as a matrix and at least one transition metal element as an activator selected from the group consisting of manganese (Mn), chromium (Cr), vanadium (V), cobalt (Co), copper (Cu), silver (Ag), tin (Sn), and titanium (Ti); wherein the oxide phosphor further contains at least one rare earth metal element as an activator.

2. An oxide phosphor for use in an electroluminescent device according to claim 1, wherein the yttrium (Y) oxide is yttrium oxide ($Y_2O_3$).

3. An oxide phosphor for use in an electroluminescent device according to claim 1, which phosphor contains the transition metal element in an amount of about 0.1–10 at. % based on yttrium (Y).

4. An oxide phosphor for use in an electroluminescent device, which phosphor comprises, as a matrix, a Y—Ge—O oxide containing yttrium (Y) and germanium (Ge) and, as an activator, at least one metallic element.

5. An oxide phosphor for use in an electroluminescent device according to claim 4, which phosphor contains germanium (Ge) in an amount of about 0.01–99 mol % based on the total amount of yttrium (Y) and germanium (Ge).

6. An oxide phosphor for use in an electroluminescent device according to claim 4, wherein the matrix is a complex oxide comprising yttrium oxide ($Y_2O_3$) and germanium oxide ($GeO_2$).

7. An oxide phosphor for use in an electroluminescent device according to claim 4, wherein the matrix is at least one ternary compound selected from the group consisting of $Y_2GeO_5$, $Y_2Ge_2O_7$, and $Y_4GeO_8$ (yttrium germanates).

8. An oxide phosphor for use in an electroluminescent device according to claim 4, wherein silicon (Si) is partially substituted for germanium (Ge) in the matrix.

9. An oxide phosphor for use in an electroluminescent device according to claim 8, wherein the phosphor contains silicon (Si) in an amount of about 0.01–99 mol % based on the total amount of germanium (Ge) and silicon (Si).

10. An oxide phosphor for use in an electroluminescent device according to claim 4, wherein the activator is at least one metallic element selected from the group consisting of transition metal elements and rare earth metal elements.

11. An oxide phosphor for use in an electroluminescent device according to claim 10, wherein the phosphor contains the metallic element in an amount of 0.1–10 at. % based or yttrium (Y).

12. An electroluminescent device employing, as a light-emitting layer, an oxide phosphor as recited in claim 1.

13. An electroluminescent device employing, as a light-emitting layer, an oxide phosphor for use in an electroluminescent device as recited in claim 4.

14. An electroluminescent device according to claim 12, wherein the light-emitting layer is in the form of thin film.

15. An electroluminescent device according to claim 13, wherein the light-emitting layer is in the form of thin film.

16. An oxide phosphor for use in an electroluminescent device, which phosphor comprises an yttrium (Y) oxide as a matrix and manganese (Mn) as an activator.

17. An oxide phosphor for use in an electroluminescent device according to claim 16, wherein the yttrium (Y) oxide is yttrium oxide ($Y_2O_3$).

18. An electroluminescent device employing, as a light-emitting layer, an oxide phosphor for use in an electroluminescent device as recited in claim 16.

19. An electroluminescent device employing, as a light-emitting layer, an oxide phosphor for use in an electroluminescent device as recited in claim 1.

20. An oxide phosphor for use in an electroluminescent device according to claim 1, wherein the at least one rare earth metal element is selected from the group consisting of europium (Eu), terbium (Tb), cerium (Ce), thulium (Tm), neodymium (Nd), erbium (Er), holmium (Ho), ytterbium (Yb), samarium (Sm), dysprosium (Dy), and praseodymium (Pr).

* * * * *

UNITED STATES PATENT AND TRADEMARK OFFICE
CERTIFICATE OF CORRECTION

PATENT NO.    : 6,707,249 B2
DATED         : March 16, 2004
INVENTOR(S)   : Minami et al.

It is certified that error appears in the above-identified patent and that said Letters Patent is hereby corrected as shown below:

Column 13,
Line 3, change "based or" to read -- based on --.

Signed and Sealed this

Fourth Day of January, 2005

JON W. DUDAS
*Director of the United States Patent and Trademark Office*